United States Patent [19]
Otsuki et al.

[11] Patent Number: 5,624,587
[45] Date of Patent: Apr. 29, 1997

[54] LASER MACHINING APPARATUS AND METHOD OF SETTING FOCUS THEREOF

[75] Inventors: Tetsuya Otsuki; Manabu Kubo, both of Aichi, Japan

[73] Assignee: Mitsubishi Denki Kabushiki Kaisha, Tokyo, Japan

[21] Appl. No.: 207,057

[22] Filed: Mar. 8, 1994

[30] Foreign Application Priority Data

Mar. 8, 1993  [JP]  Japan ................................ 5-046633

[51] Int. Cl.⁶ .......................................... B23K 26/04
[52] U.S. Cl. ............................. 219/121.83; 219/121.75
[58] Field of Search ................... 219/121.73, 121.75, 219/121.83, 121.6, 121.61, 121.62, 121.78, 121.69; 364/474.08

[56] References Cited

U.S. PATENT DOCUMENTS

| | | | |
|---|---|---|---|
| 4,358,659 | 11/1982 | Sponheimer | 219/121.62 |
| 5,061,839 | 10/1991 | Matsuno et al. | 219/121.83 |
| 5,239,159 | 8/1993 | Masuda | 364/474.08 |
| 5,334,816 | 8/1994 | Sugiyama | 219/121.83 |

FOREIGN PATENT DOCUMENTS

| | | | |
|---|---|---|---|
| 0554523 | 8/1993 | European Pat. Off. | |
| 52-74197 | 6/1977 | Japan | 219/121.75 |
| 57-29999 | 6/1982 | Japan . | |
| 61-165288 | 7/1986 | Japan . | |
| 61-193795 | 8/1986 | Japan | 219/121.78 |
| 62-259691 | 11/1987 | Japan | 219/121.75 |
| 63-97386 | 4/1988 | Japan | 219/121.78 |
| 63-80087 | 5/1988 | Japan . | |
| 63-295087 | 12/1988 | Japan | 219/121.73 |
| 64-78691 | 3/1989 | Japan . | |
| 64-87692 | 3/1989 | Japan . | |
| 64-66088 | 3/1989 | Japan | 219/121.85 |
| 64-87093 | 3/1989 | Japan | 219/121.62 |
| 2-220794 | 9/1990 | Japan . | |
| 2-280984 | 11/1990 | Japan | 219/121.78 |
| 2-280987 | 11/1990 | Japan | 219/121.73 |
| 5-8070 | 1/1993 | Japan | 219/121.61 |

*Primary Examiner*—Geoffrey S. Evans
*Attorney, Agent, or Firm*—Sughrue, Mion, Zinn, Macpeak & Seas

[57] ABSTRACT

The focus of a laser machining apparatus is set by reading a program for setting the focus of the laser beam on a workpiece; irradiating the workpiece with the laser beam according to the program for setting the focus; moving a machining lens relative to the workpiece while keeping constant the distance between the machining head and the surface of the workpiece; detecting information regarding the relative distance between the machining lens and the workpiece; judging that the laser beam has focused on the workpiece when the detected relative distance information has exceeded a predetermined range and when a blue flame occurs; and storing the position information of the machining lens at the time when it is judged that the laser beam has focused on the workpiece.

14 Claims, 9 Drawing Sheets

LASER MACHINING APPARATUS AND METHOD OF SETTING FOCUS THEREOF

BACKGROUND OF THE INVENTION

1. Field of the Invention

The present invention relates to the field of laser processing, and, in particular to a system in which a laser machining apparatus automatically performs focus position detection as a required preparatory operation to perform laser machining, stores detected data in a memory, and automatically performs focus position determination.

2. Description of the Background Art

A two-dimensional laser machining apparatus has been employed to cut a plate workpiece in contactless relation at a high speed and with a high accuracy. The two-dimensional laser machining apparatus controls a machining head along X, Y and Z axes, and cuts a workpiece using a laser beam which is introduced from a laser oscillator and outputted from the tip of the machining head. Usually, from a machining quality point of view, it is desirable that the laser beam be focused on the surface of the workpiece, so that when the workpiece is cut using the laser beam, it is necessary to perform a focus setting operation distinct from the actual machining operation. During actual machining, based on the height of the machining head determined by the focus setting operation, a height detecting sensor is mounted to the tip of the machining head, and machining is performed by following the outline of the workpiece so as to keep constant the distance from the tip to the workpiece by using the detecting sensor.

Figure 8:
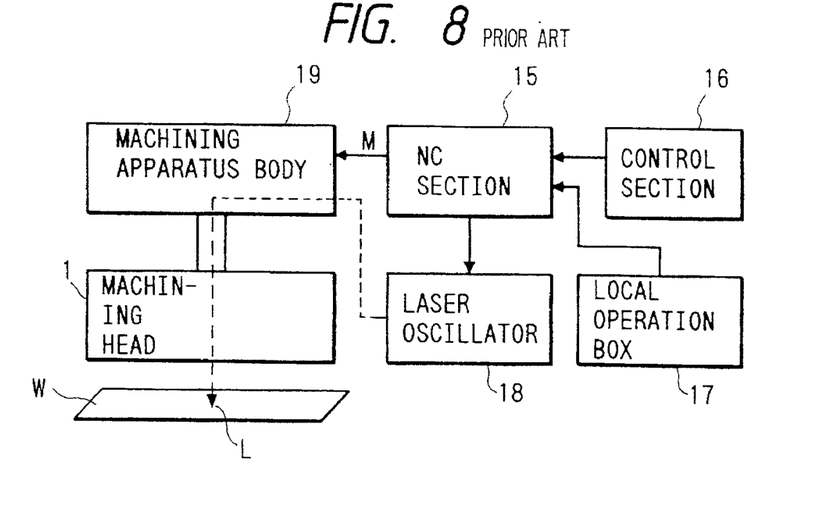
FIG. 8 is a block diagram of a two-dimensional laser machining apparatus.
Figure 9:
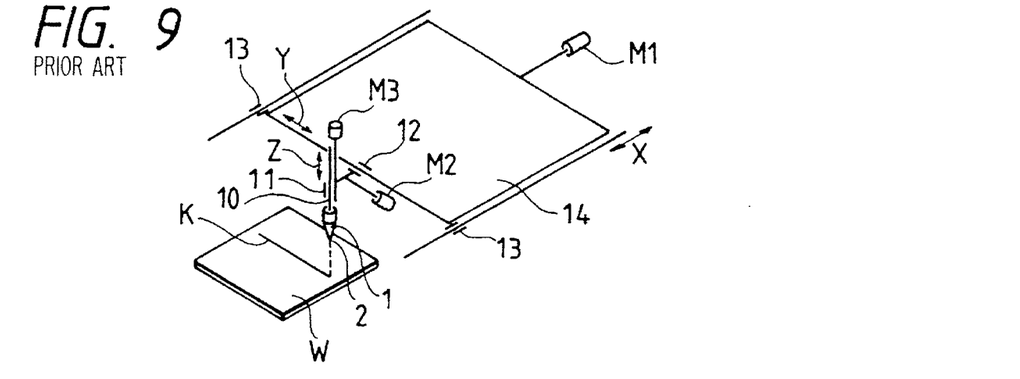
FIG. 9 is a perspective view of a two-dimensional laser machining apparatus.

With reference to FIGS. 8 and 9, the general configuration of a two-dimensional laser machining apparatus will be explained hereinafter. Numeral 1 indicates a machining head which is mounted for movement along a Z axis 10. Numeral 2 indicates a distance sensor which functions as a focus detection means and is mounted on the tip of the machining head 1. Numeral 11 indicates a Z axis guide which guides the movement of the machining head 1 driven by the motor M3 in the direction of arrow Z; numeral 12 a Y axis guide which guides the movement of the machining head 1 driven by the motor M2 in the direction of arrow Y; and numeral 13 an X axis guide which guides the movement of the machining head 1 driven by the motor M1 in the direction of arrow X. The motors M1 through M3 are driven by a drive signal M from an NC (numerical control) control section 15, and controlled in such a manner that the spot of a laser beam L follows a machining line K according to a machine processor, while the distance from the machining head 1 to a workpiece W is kept constant. In order to keep constant the distance from the machining head 1 to the workpiece W, the distance sensor 2 mounted on the tip of the machining head 1 measures the distance between the workpiece W and the machining head 1, and feeds back a measuring signal to the NC control section 15, thereby finally controlling the spot of the laser beam L. Connected to a control section 16 is a local operation box 17 which is used at the time of focus position detecting and the like. Numeral 18 indicates a laser oscillator for outputting the laser beam; and numeral 19 a machining apparatus body comprising the three guides for the X, Y and Z axis directions.

Generally, the method used for focus detection is such that a weak laser beam irradiates the workpiece, and a blue flame, derived from a plasma state occurring when the focus of the laser beam is placed on the surface of the workpiece, is visually monitored. In that method, the machining head 1 is allowed to move back by manual operation to widen the distance between the tip of the machining head and the workpiece installed on a machining table so that the tip of the machining head 1 does not interfere with the workpiece during a focus position detecting operation. Thereafter with a focusing program, the machining head is moved relatively and parallel to the workpiece while the laser beam irradiates the workpiece, and an operator finely moves only a lens in the machining head in the plus and minus directions of the Z axis by using the local operation box 17, whereby the blue flame, produced by the plasma occurring near the focus position, is visually monitored.

By using the local operation box of the two-dimensional laser machining apparatus, the operator can input the lens height for which the blue flame is found, as the height of the lens when focused, thereby setting the focus position.

After the focus position has been set, the two-dimensional laser machining apparatus is operated, while keeping the just-focused lens position found by said monitoring and setting operations, and the height of the machining head is adjusted by manual operation so as to provide the proper distance between the machining head and the workpiece.

Figure 10:
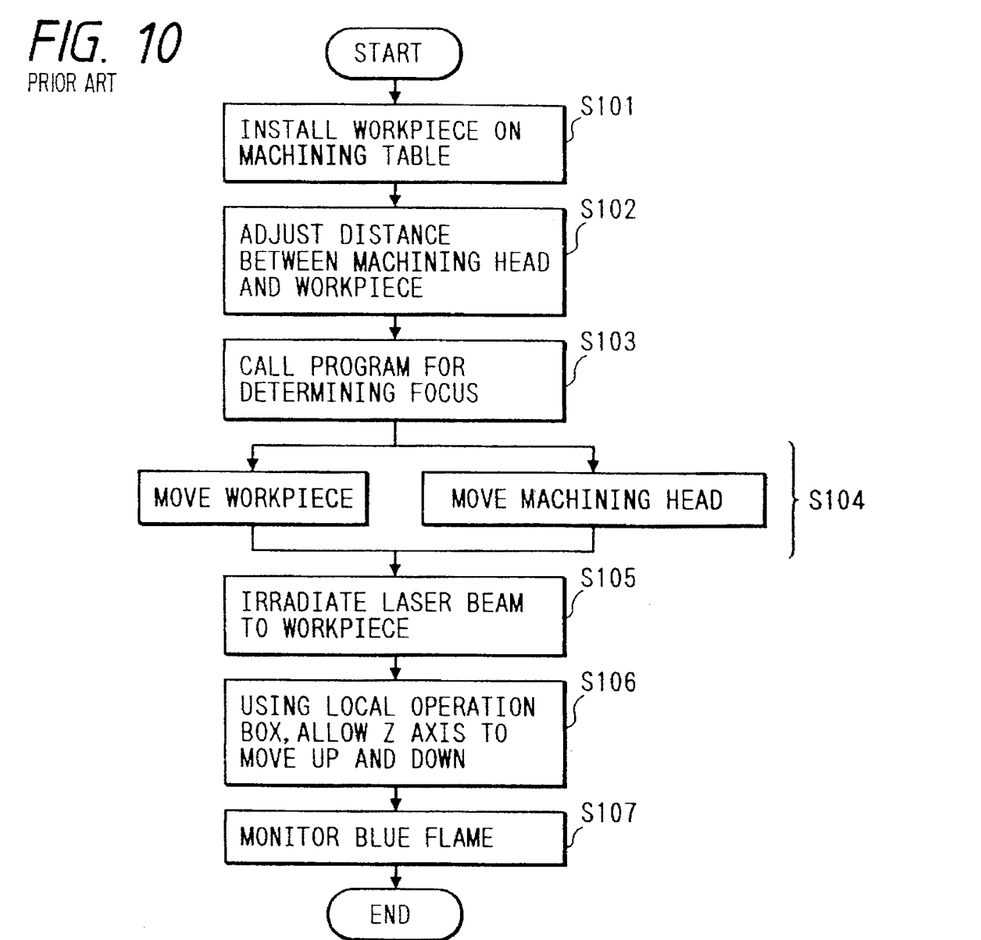
FIG. 10 is a flowchart showing the steps of a conventional blue flame monitoring operation.

FIG. 10 is a flowchart showing the steps of a conventional blue flame monitoring operation. In order to perform the operation to monitor the blue flame, after moving back the machining head, the workpiece (or test piece) W is installed on the machining table 14 to determine a focus (S101); the distance between the tip of the machining head and the workpiece W is adjusted so that the tip of the machining head 1 does not interfere with the workpiece or test piece W during the focus position detecting operation (S102); and a program for determining focus is read in the control section 15 (S103). Thereafter, according to the program operation performed by the program for determining focus, the machining head is moved relatively to the workpiece while keeping a constant distance between them (S104); and the laser beam L is irradiated (S105); whereby, while moving the machining head in the Z axis using the local operation box 17 (S106), occurrence of the blue flame is monitored by the operator (S107).

Figure 11:
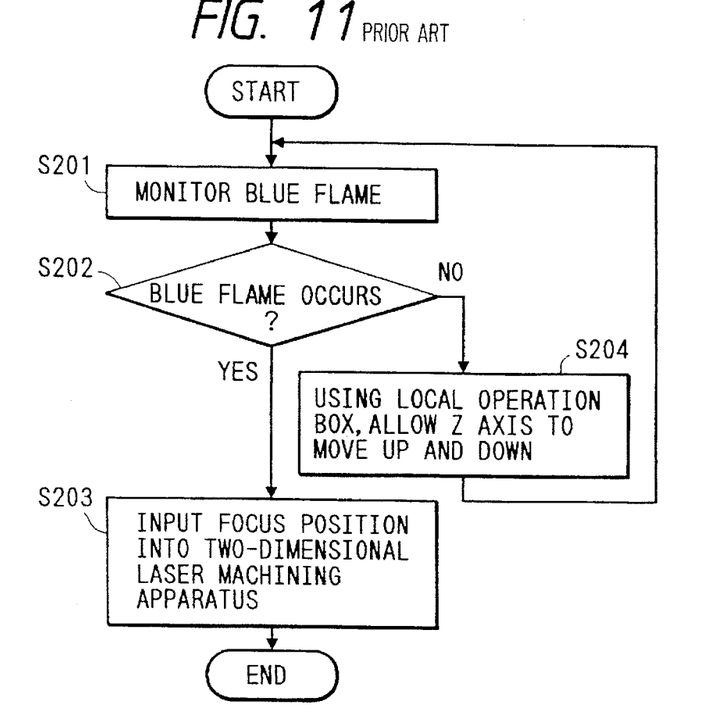
FIG. 11 is a flowchart showing the steps of a conventional focus position setting operation.

FIG. 11 is a flowchart showing the steps of a conventional focus position setting operation. The blue flame is monitored (S201); whether the blue flame occurs properly is checked (S202); and the operator inputs the height of the current position, when the blue flame properly occurs, as the proper focus height of the machining head, into the control section 16 of the laser machining apparatus (S203). When a proper blue flame does not occur in S202, using the local operation box, the machining head is moved along the Z axis up and down (S204), and the operation beginning with S201 is repeated.

Figure 12:
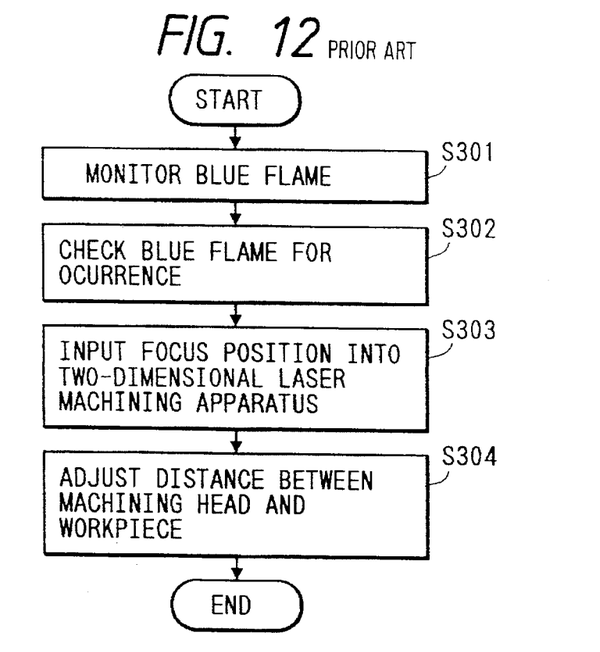
FIG. 12 is a flowchart showing the steps of a conventional focusing operation.

FIG. 12 is a flowchart showing a conventional focusing operation. After the distance between the machining head and the workpiece is widened in S101 shown in FIG. 10, the blue flame occurring is monitored by the operator (S301); whether the blue flame occurs properly is checked (S302); the operator inputs the height of the current position, as the height of the proper focus machining head, into the control section of the laser machining apparatus (S303); and the widened distance between the machining head and the workpiece is adjusted to a proper state (S304). Where a test piece has been used in the above focusing operation, the test piece on the machining table is replaced with the workpiece to start an actual machining operation. Where the above focusing operation has been performed using the workpiece, after completion of the above operation, an actual machining operation is started in that condition.

Conventionally, the distance between the machining head and the workpiece being cut is controlled by a contactless sensor mounted on the tip of the machining head as disclosed in Japanese Laid-Open Patents SHO64-78691 and SHO64-78692.

The former reference discloses a laser machining apparatus which includes a contactless gap sensor, sampling command/drive means and a sampling data storage circuit, wherein, while a machining head is moved away from a reference position from a workpiece in an increment of a specified amount by performing a sampling command with the command means, an output value of the gap sensor is stored in the data storage circuit, whereby the gap sensor output value is controlled in a manner to become the stored data value corresponding to the command gap from a control section.

The latter reference discloses a laser machining apparatus which includes machining head check means, reference output setting means and machining head good/bad judgment means, wherein a machining head is automatically positioned at a check reference position by being given a check command, and a sensor output is measured, whereby the position of the machining head is judged by whether the value is within a predetermined reference output or not. Another device, in which the tip of a machining head is provided with a contactless sensor, and which relates to the control that controls the distance between a workpiece and a machining head during teaching based on a height set in a control panel, is disclosed in Japanese Laid-Open Patent SHO61-165288.

None of the above-mentioned three conventional devices provide continuous monitoring and recording of blue flame, and processing of the data to calculate a focus position.

Although in the blue flame monitoring operation in conventional art a laser beam irradiates a workpiece, and an operator finely moves a machining head in the Z direction using a local operation box such that the workpiece and the machining head are allowed to move relatively to each other at a certain speed, whereby the operator visually monitors the occurrence of the blue flame produced by plasma occurring near the just-focused position, there has been a problem that the monitoring is too complex. Another problem is that the occurrence of the blue flame as detected by the monitoring operation cannot be continuously stored, so that the operator must frequently perform the focus position detection for each monitoring operation to input a current Z axis value through a control section.

Still another problem is that the conventional art focusing is performed by an operator, whereby the detected focus position depends on the degree of skillfulness of the operator, and also whereby the determination of focus position requires non-productive time not accompanied by actual machining. Another problem is that a proper focus position is difficult to determine, whereby a proper focusing cannot be performed, thereby providing a poor machining.

SUMMARY OF THE INVENTION

Figure 3:
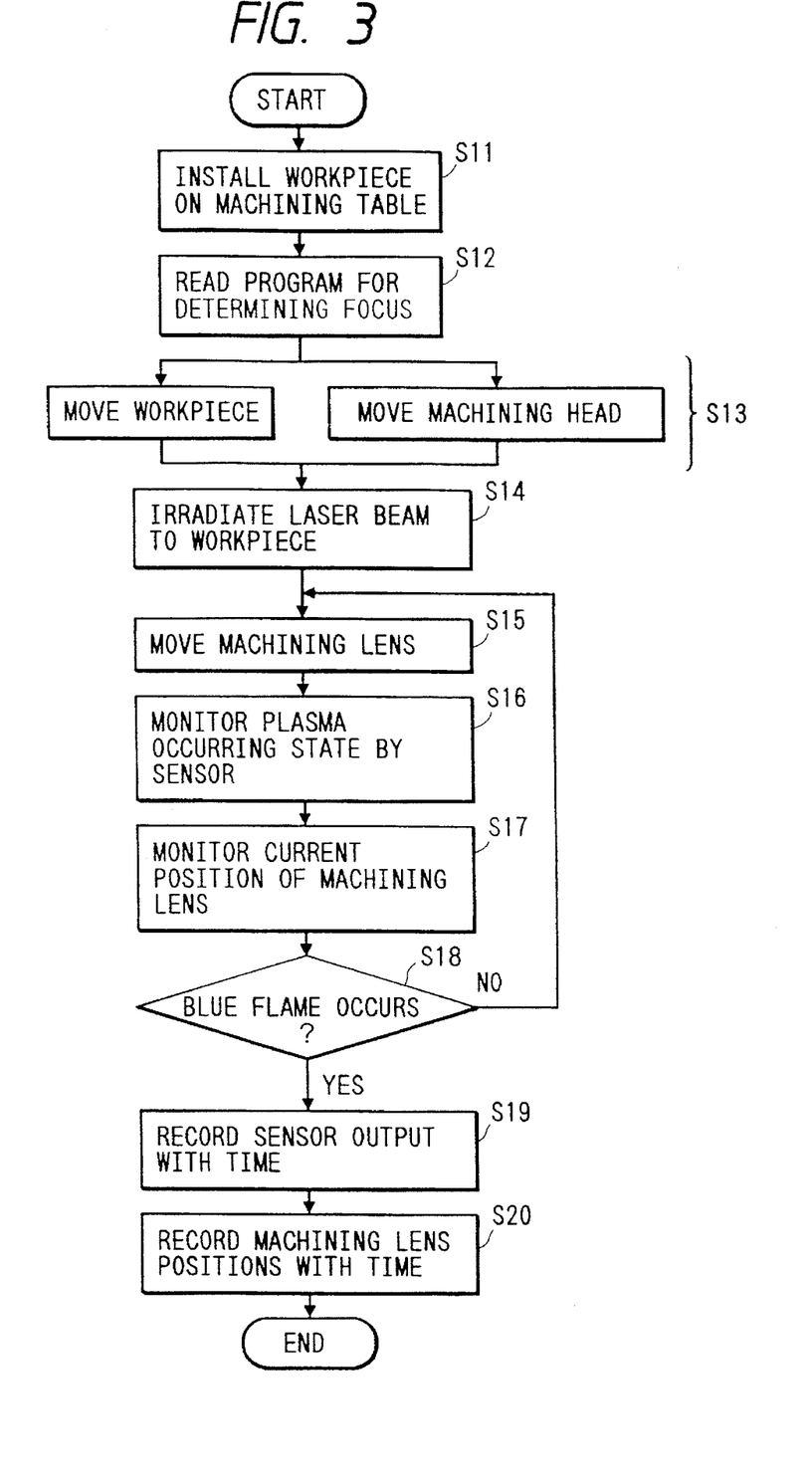
FIG. 3 is a flowchart of a focus setting operation of a laser machining apparatus as an embodiment of the first through third aspects.

One aspect of the invention may be summarized as follows:

The method of setting the focus of a laser machining apparatus, comprising the steps of:

(1) reading a program for setting the focus of the laser beam on a workpiece (FIG. 3-S12);

(2) irradiating the workpiece with the laser beam according to said program for setting the focus (FIG. 3-S14);

(3) moving a machining lens relative to the workpiece while keeping constant the distance between the machining head and the surface of the workpiece (FIG. 3-S15);

(4) detecting information regarding the relative distance between said machining lens and said workpiece (FIG. 3-S17);

(5) judging that the laser beam has focused on the workpiece when the detected relative distance information has exceeded a predetermined range (FIG. 3-S18); and (6) storing the position information of the machining lens at the time when it is judged that the laser beam has focused on said workpiece (FIG. 3-S20).

A laser machining apparatus in connection with a second aspect has an oscillator, a machining lens which is movably mounted in a machining head and directs a laser beam outputted from the oscillator onto a workpiece, and focus detection means for detecting a focus of the machining lens, wherein the machine has focus information storage means for storing the information outputted by the focus detection means.

A laser machining apparatus in connection with a third aspect has an oscillator, a machining lens which is movably mounted in a machining head and directs a laser beam outputted from said oscillator onto a workpiece, and focus detection means for detecting a focus of the machining lens, wherein said machine has focus information storage means for storing the information outputted by the focus detection means, and position information storage means for storing the position information of the machining lens.

A laser machining apparatus in connection with a fourth aspect has an oscillator, a machining lens which is movably mounted in a machining head and gathers a laser beam outputted from said oscillator on a workpiece, and focus detection means for detecting a focus of the machining lens, wherein said machine has machining lens position information processing means for determining a machining lens position at which focusing is suitable, from the information outputted by the focus detection means.

A laser machining apparatus in connection with a fifth aspect has a composition such that the laser machining apparatus of the first or second aspect has focus interval detection means for detecting an interval of focusing is suitable, from the information outputted by the focus detection means, and machining lens position information processing means for determining the machining lens position at each of starting and ending points of said interval.

A laser machining apparatus in connection with a sixth aspect has a composition such that the laser machining apparatus of the fifth aspect has focus position calculation means for calculating the focus position of said machining lens based on the two positions determined by the machining lens position detection means.

A laser machining apparatus in connection with a seventh aspect has a composition such that the focus detection means of the laser machining apparatus of the second through sixth aspects detects a blue flame occurring when the focus of the laser beam is placed on the surface of the workpiece.

The laser machining method in connection with the first aspect improves machining accuracy and therefore product quality.

The laser machining method in connection with the second aspect enables the focus information to be stored.

The laser machining method in connection with the third aspect enables the focus information and the machining lens position information to be stored simultaneously.

The laser machining method in connection with the fourth aspect enables the machining lens focus position to be determined.

The laser machining method in connection with the fifth aspect enables the machining lens position suitable for machining to be determined.

The laser machining method in connection with the sixth aspect enables the machining lens focus position to be determined with a higher accuracy.

DESCRIPTION OF PREFERRED EMBODIMENTS

Embodiment 1

Figure 1:
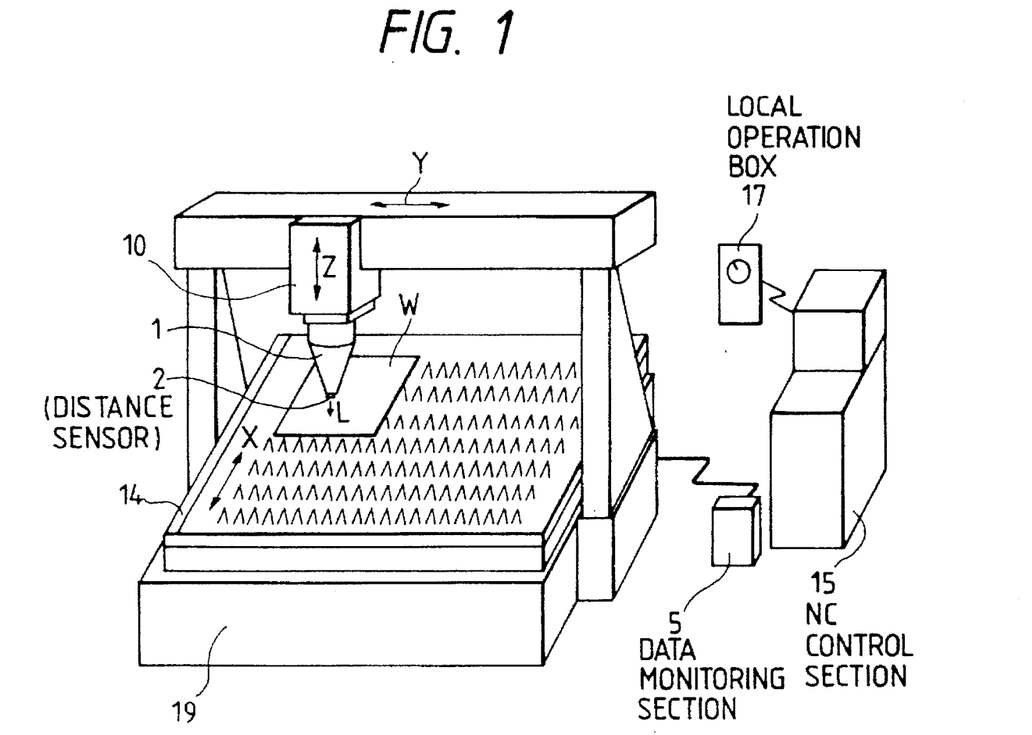
FIG. 1 is a perspective view of a laser machining apparatus system as an embodiment of the first through third aspects.

FIG. 1, which shows an embodiment of the first through third aspects, is a perspective view of a two-dimensional laser machining apparatus monitoring a plasma state. Numeral 1 indicates a machining head; numeral 2 a capacitance type distance sensor; numeral 10 a Z axis unit capable of moving the machining head in the Z axis direction; numeral 14 a machining table; numeral 19 a machining apparatus body; numeral 15 a control section of the machining apparatus body 19; numeral 17 a local operation box connected to the machining apparatus body 19; and numeral 5 a data monitoring section which monitors continuously with time both the output processed in a sensor processing section for processing a sensor output obtained by the distance sensor 2, and the current value of a machining lens sequentially varying and obtained by a machining lens drive mechanism 4.

Figure 2:
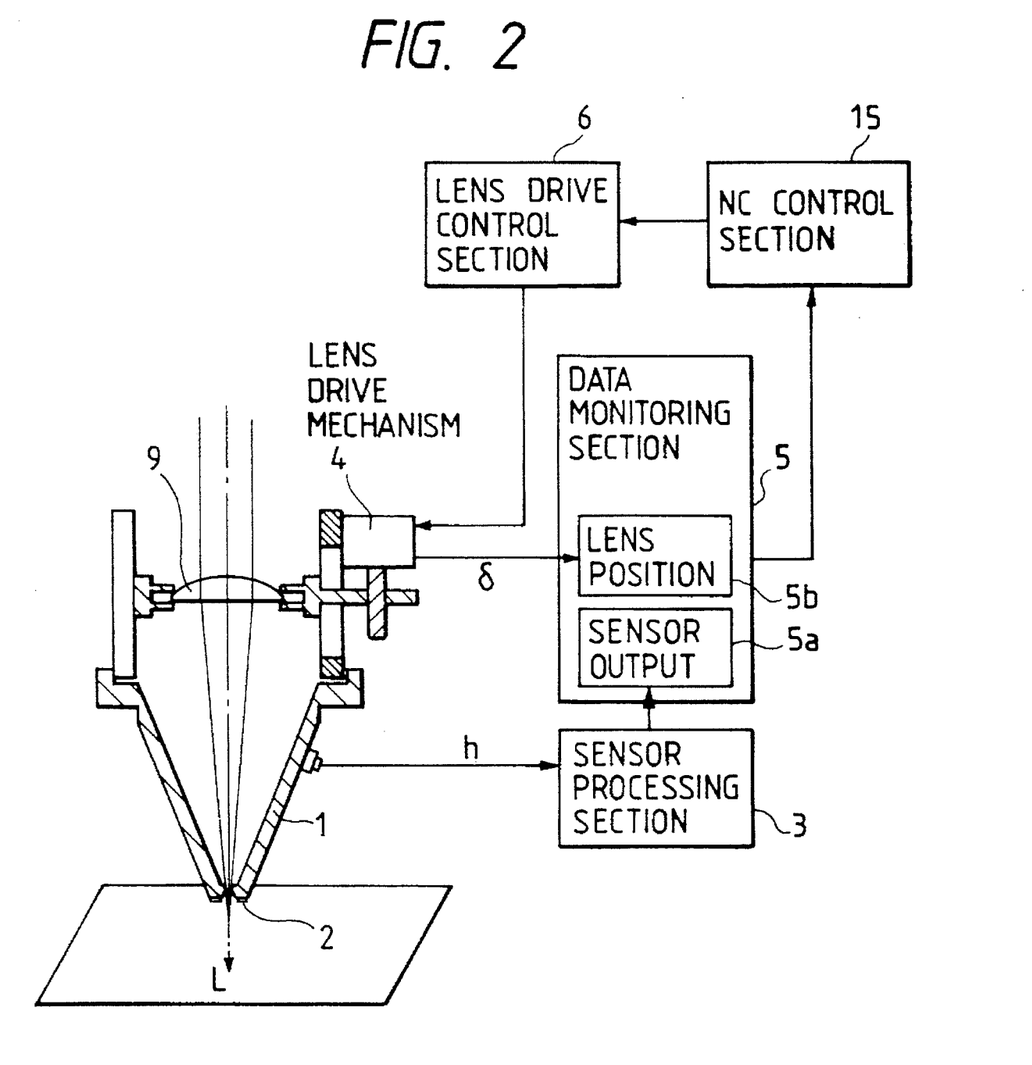
FIG. 2 is a schematic diagram of a focus setting equipment of a laser machining apparatus as an embodiment of the first through third aspects.

FIG. 2 is a view showing the details of focus setting equipment of the laser machining apparatus of FIG. 1. In FIG. 2, numeral 3 indicates a sensor processing section for processing a sensor output "h" obtained by the distance sensor 2; and numeral 4 indicates the machining lens drive mechanism for driving a machining lens 9. Numeral 5 indicates the data monitoring section which monitors continuously with time both the output processed in the sensor processing section 3 and the current value of the machining lens sequentially varying and obtained by the machining lens drive mechanism 4, and includes a position information storage subsection 5b for storing a position information "δ" from the machining lens drive mechanism 4 and a position information storage subsection 5a for storing an output from the sensor processing section therein. Numeral 15 indicates an NC control section; and numeral 6 indicates a machining lens drive control section.

FIG. 3 is a flowchart of an automatic focus data recording of the laser machining apparatus shown in FIG. 2. Based on FIGS. 2 and 3, the operational steps of the automatic focus data recording will be explained hereinafter. A workpiece is installed on the machining table 14 in the workpiece W installing step S11; a program for determining focus is called in the program calling step S12; and, while according to the program called in step S12 the machining head is moved relatively to and kept at a certain distance from the installed workpiece W in the program-run operational step S13, a laser beam L having an output specified by the program called in step S12 irradiates the workpiece W (S14). At this point, while the laser beam L is irradiating the workpiece, the machining lens is allowed to move up and down by the machining lens drive mechanism 4 (S15) to monitor sensor information and machining lens position information (S16, S17). While the above operations are being performed, the occurrence of a blue flame is monitored (S18), and if the blue flame occurs, the sensor output and the machining lens position information are respectively recorded with time in the information storage subsections 5a and 5b shown in FIG. 2 (S19, S20). If the blue flame does not occur, the operation is returned to step S15, where the machining lens is again allowed to move up and down, thereby monitoring for occurrence of the blue flame. The NC control section 15 controls the lens drive control panel 6 using the data of the information storage subsections 5a and 5b.

Figure 4:
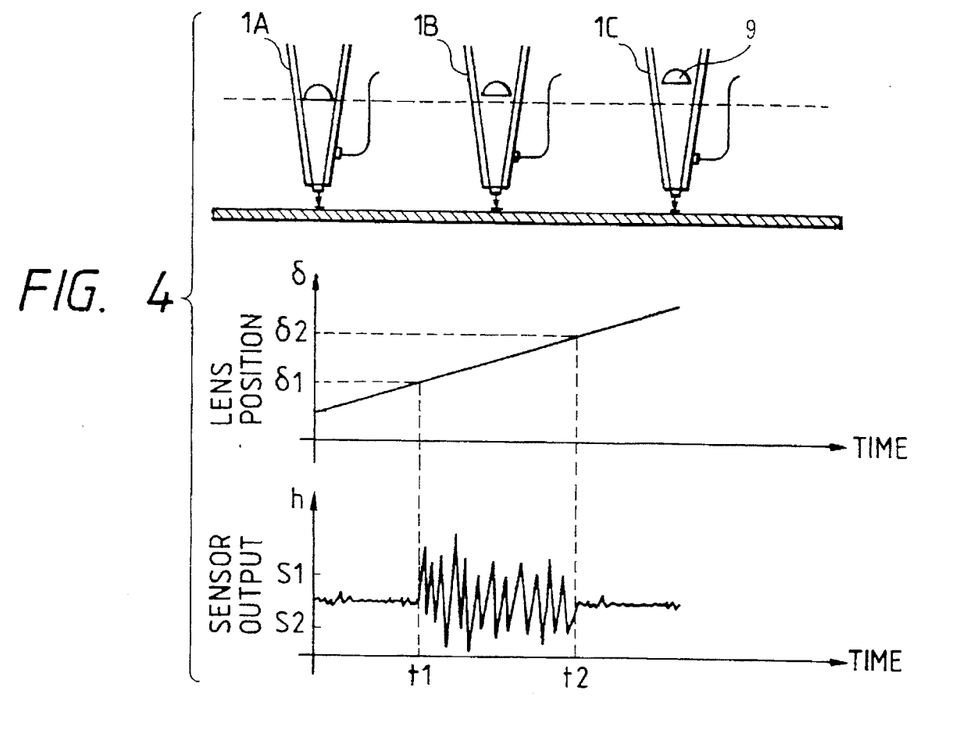
FIG. 4 is a graph showing the relationship between sensor output and machining lens position data recorded by a laser machining machine as an embodiment of the first through third aspects.

FIG. 4 shows a relationship between the sensor output data and the position data of the machining lens 9 recorded by the laser machining apparatus of an embodiment of the first through third aspects of the invention. The machining head 1 moves from the position 1A, through 1B, to 1C in parallel with the workpiece W at a certain speed while keeping a certain height above the workpiece. The machining lens 9 is moved in the Z axis direction interlocking with the movement of the machining head 1. When the focus of the laser beam L approaches a just-focused position on the surface of the workpiece W, a blue flame occurs by the plasma occurring by the micro laser beam L irradiated to the workpiece W (for interval between t1 and t2). This state is read in the sensor processing section 3 as the sensor output obtained by the distance sensor 2 mounted to the tip of the machining head 1, and both the read data and the current position of the machining lens 9, driven by the machining lens drive mechanism 4, are read continuously with time to record. Where the machining state becomes bad because of an external cause during actual machining, the position data of the machining lens 9 within the blue flame occurring interval (t1 to t2) is fetched from the focus information storage subsection 5a and the lens position information storage subsection 5b of the focus setting equipment, and the position of the machining lens 9 when just focused is determined, whereby the machining lens 9 is again moved to the just-focused position to restart the machining.

Embodiment 2

Figure 5:
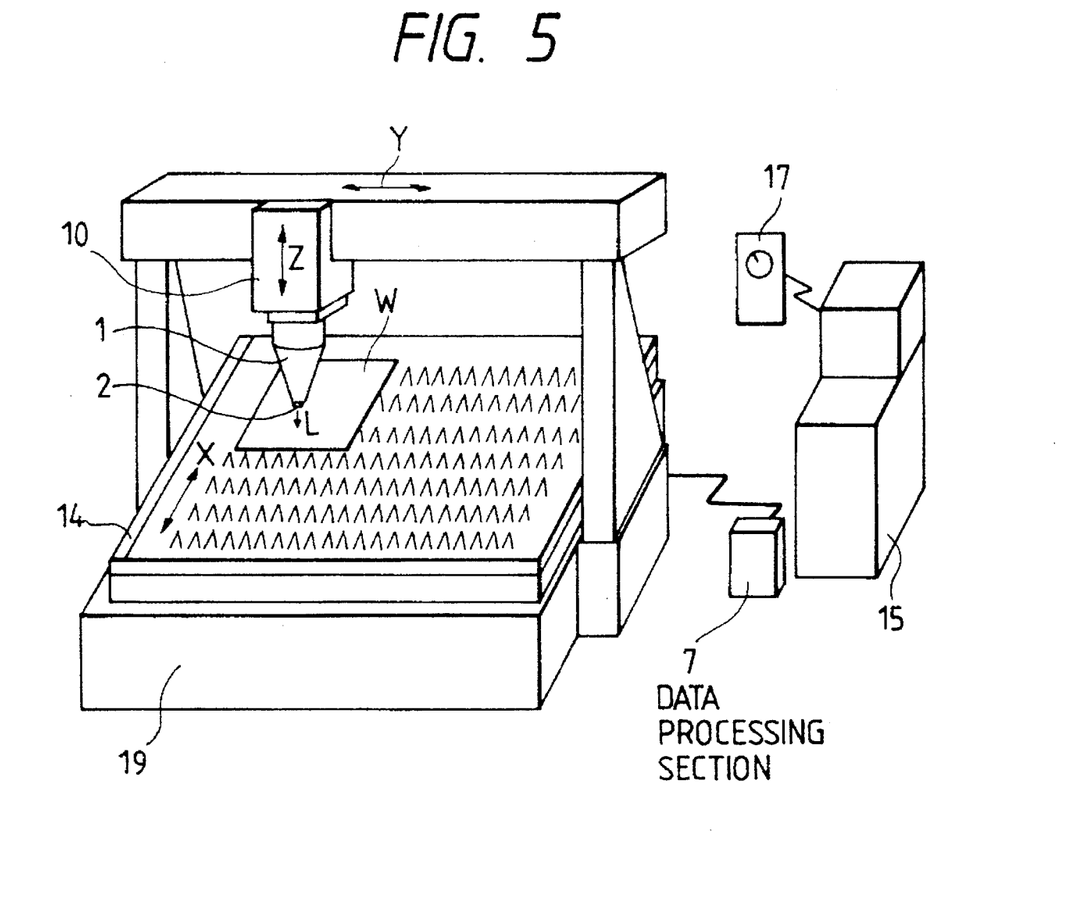
FIG. 5 is a perspective view of a laser machining apparatus system as an embodiment of the fourth through sixth aspects.

FIG. 5, which shows an embodiment of the fourth through sixth inventions, is a perspective view of a two-dimensional laser machining apparatus for determining a plasma state. Numeral 1 indicates a machining head; numeral 2 a capacitance-type distance sensor; numeral 10 a Z axis unit capable of moving the machining head in the Z axis direction; numeral 14 a machining table; numeral 19 a machining apparatus body; numeral 15 a control section of the machining apparatus body 19; numeral 17 a local operation box connected to the machining apparatus body 19; and numeral 7 a data processing section which records continuously with time both the output processed in a sensor processing section 3 for processing a sensor output obtained by the distance sensor 2, and the current value of a machining lens sequentially varying and obtained by a machining lens drive mechanism 4 and processes the data.

Figure 6:
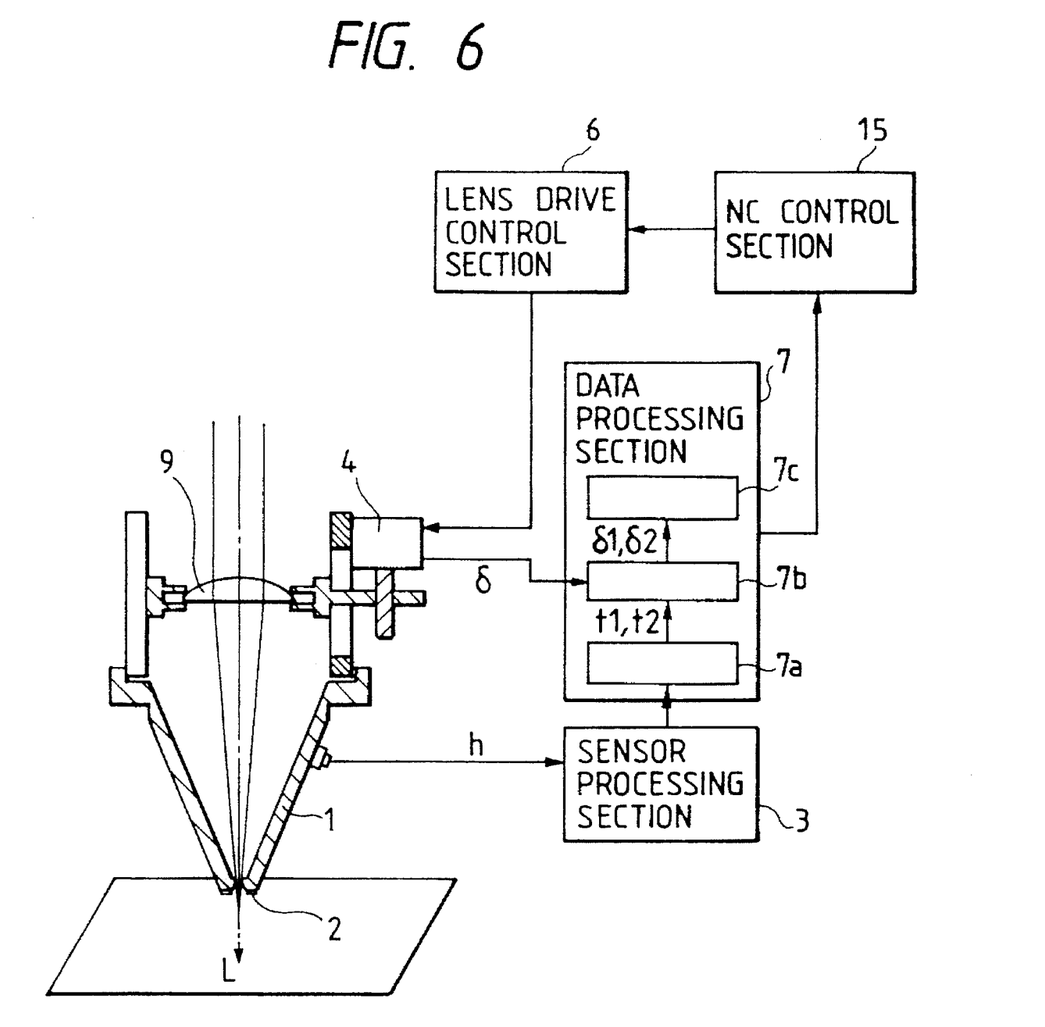
FIG. 6 is a schematic diagram of focus setting equipment of a laser machining apparatus as an embodiment of the fourth through sixth aspects.

FIG. 6 is a view showing the details of focus setting equipment of the laser machining apparatus of FIG. 5. In FIG. 6, numeral 3 indicates a sensor processing section for processing a sensor output "h" obtained by the distance sensor 2; and numeral 4 indicates a machining lens drive mechanism for driving a machining lens 9. Numeral 7 indicates a data processing section, which determines the position of the machining lens 9, when just focused, from both the position information of the machining lens and the sensor output, and includes: a blue flame occurrence start/end time-detecting subsection 7a for detecting the start time t1 and the end time t2 of a blue flame occurrence interval; a machining lens position information processing subsection 7b for determining machining lens position data $\delta 1$, $\delta 2$ at the two times (t1, t2) by a signal outputted from the time-detecting subsection 7a when the blue flame occurs or ends, and a focus-position calculating subsection 7c for calculating an optimum focus position based on the two position data $\delta 1$, $\delta 2$. Numeral 15 indicates an NC control section; and numeral 6 indicates a machining lens drive control section.

Figure 7:
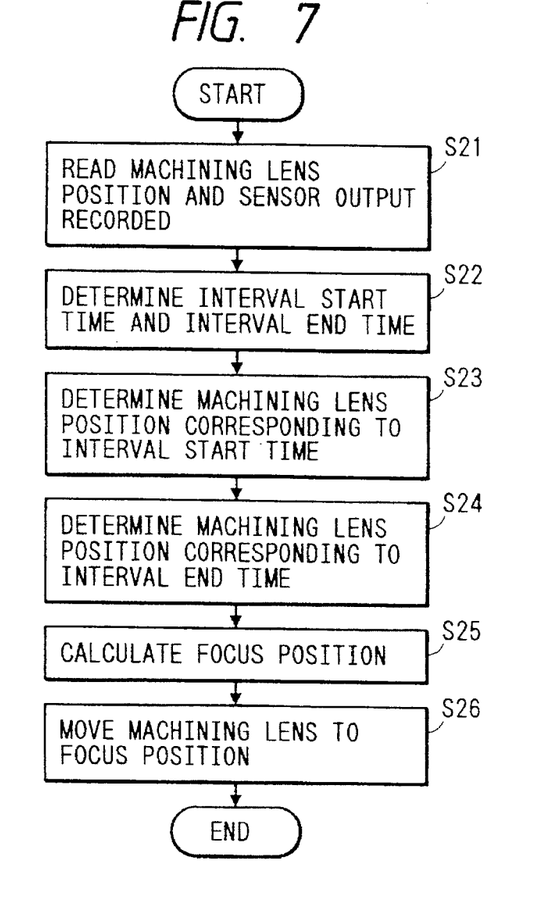
FIG. 7 is a flowchart of a focus setting operation of a laser machining apparatus as an embodiment of the fourth through sixth aspects.

FIG. 7 is a flowchart showing the operational steps of the laser machining apparatus of an embodiment of the fourth through sixth aspects of the invention. Based on this flowchart and FIG. 6, the operation of the machine of an embodiment of the fourth through sixth aspects of the invention inventions will be explained hereinafter. The sensor output data and the position data of the machining lens 9 in FIG. 6 are read in step S21; and the blue flame occurrence start time t1 and the blue flame occurrence end time t2 are determined by the blue flame occurrence start/end time detecting subsection 7a in the data processing section 7 in step S22. Then, the signal from the blue flame occurrence start/end time detecting subsection 7a is received, whereby the position data $\delta 1$ and $\delta 2$ of the machining lens 9, which correspond to the times t1 and t2, are determined from the occurrence interval by the machining lens position information processing subsection 7b in the data processing section 7 (S23, S24); and the position 6 of the machining lens 9 when just focused is calculated from the two positions of the machining lens 9 by the focus position calculating subsection 7c in the data processing section 7 (S25). The calculated position of the machining lens 9 when just focused is instructed through the NC control section to the machining lens drive control panel, whereby the machining lens 9 is moved, in a manner to reach the just-focusing state, by the machining lens drive mechanism 4 (S26).

In the blue flame occurrence start/end time detecting subsection 7a, if a variation of the sensor output data exceeds a threshold limit value, a blue flame is judged to occur. That is, a time when the sensor output state turns from a steady one to an unsteady one is recognized to be the time of the start of blue flame occurrence; and a condition that the threshold limit value is reversely exceeded, that is, a time when the sensor output state turns from an unsteady one to a steady one is recognized to be the time of the end of blue flame occurrence. The output data is recorded continuously with time, so that the blue flame occurring time can also be determined by the blue flame occurrence start time t1 and the blue flame occurrence end time t2.

In the focus position calculating subsection 7c, the position $\delta$ of the machining lens 9 when just focused is determined by the following arithmetic equation (S26).

Generally, $\delta$ is represented by the following equation:

$$\delta(\delta 1, \delta 2) = (m\ \delta 1 + n\ \delta 2)/(m+n)$$

provided that m and n are coefficients varying with the machining method. For example, where m=1, and n=1, $\delta$ is determined by the following equation:

$$\delta = (\delta 1 + \delta 2)/2$$

Although the above embodiments have shown the focusing operation using a workpiece, a test piece may be used in place of the workpiece, in which case, after completion of the focusing operation, the test piece on the machining table needs only to be replaced with the workpiece. In the above description, the distance sensor 2 has been shown as a capacitance type but is not limited to that type, and sensors of other types capable of checking the occurrence of blue flame may be used. For example, an optical sensor, a magnetic sensor and the like may be used. Although in the above description, the present invention has been described in case where it is loaded into an equipment other than a control one and utilized for a two-dimensional laser machining apparatus, it will be appreciated that the present invention can be incorporated into, for example, the NC control equipment of a two-dimensional laser machining apparatus.

According to the present invention as previously described, the focus position detection can be performed in a short time regardless of the skill of an operator, and the focus position can be determined uniquely, so that the present invention has the effect of reducing poor machining caused by an error in fine focus position setting by an operator.

What is claimed is:

1. A method of setting a focus of a laser machining apparatus having a machining lens which focuses a laser beam and is moveably mounted in a machining head, said method comprising the steps of:

moving the machining lens relative to a workpiece while maintaining a constant distance between the machining head and a surface of the workpiece;

detecting information indicative of a relative distance between the machining lens and the workpiece;

determining that the laser beam has focused on the workpiece when the detected relative distance information exceeds a predetermined range; and storing the detected relative distance information at a time when it is determined that the laser beam has focused on the workpiece.

2. A method as claimed in claim 1, further comprising steps of:

reading a computer program for setting the focus; and irradiating a surface of the workpiece with the laser beam according to said program.

3. A laser machining apparatus comprising an oscillator, a machining lens which is movably mounted in a machining head and focuses on a workpiece a laser beam outputted from said oscillator, and focus detection means fixedly secured to said machining head for detecting a focus of the machining lens and for outputting corresponding focus information, wherein said machining lens is independently movable relative to said focus detection means, and wherein said apparatus comprises focus information storage means for storing the focus information outputted by said focus detection means.

4. A laser machining apparatus as defined in claim 3, wherein the focus detection means detects a blue flame occurring when the laser beam is focused on a surface of the workpiece.

5. A laser machining apparatus comprising an oscillator, a machining lens which is movably mounted in a machining head and focuses on a workpiece a laser beam outputted from said oscillator, and focus detection means fixedly secured to said machining head for detecting a focus of the machining lens and for outputting corresponding focus information, wherein said machining lens is independently movable relative to said focus detection means, and wherein said apparatus further comprises focus information storage means for storing the focus information outputted by said focus detection means, and position information storage means for storing information indicative of a position of said machining lens.

6. A laser machining apparatus as defined in claim 5, wherein the focus detection means detects a blue flame occurring when the laser beam is focused on a surface of the workpiece.

7. A laser machining apparatus as defined in claim 5, wherein said machine comprises focus interval detection means for detecting a time interval, during which focusing is suitable, from the information outputted by the focus detection means, and machining lens position information processing means for determining a position of the machining lens at each of starting and ending points of said time interval.

8. A laser machining apparatus as defined in claim 7, wherein said machine has focus position calculation means for calculating the focus position of said machining lens based on the two positions determined by the machining lens position information processing means.

9. A laser machining apparatus as defined in claim 7, wherein the focus detection means detects a blue flame occurring when the laser beam is focused on a surface of the workpiece.

10. A laser machining apparatus having an oscillator, a machining lens which is movably mounted in a machining head and focuses on a workpiece a laser beam outputted from said oscillator, and focus detection means fixedly secured to said machining head for detecting a focus of the machining lens and for outputting corresponding focus information, wherein said machining lens is independently movable relative to said focus detection means, and wherein said apparatus further comprises machining lens position information processing means for determining, based on the information outputted by the focus detection means, a machining lens position at which focusing is suitable.

11. A laser machining apparatus as defined in claim 10, wherein the focus detection means detects a blue flame occurring when the laser beam is focused on a surface of the workpiece.

12. A laser machining apparatus as defined in claim 10, wherein said machine comprises focus interval detection means for detecting a time interval, during which focusing is suitable, from the information outputted by the focus detection means, and machining lens position information processing means for determining a position of the machining lens at each of starting and ending points of said time interval.

13. A laser machining apparatus as defined in claim 12, wherein the focus detection means detects a blue flame occurring when the laser beam is focused on a surface of the workpiece.

14. A laser machining apparatus as defined in claim 12, wherein said machine has focus position calculation means for calculating the focus position of said machining lens based on the two positions determined by the machining lens position detection means.

* * * * *